United States Patent Office 3,241,063
Patented Mar. 15, 1966

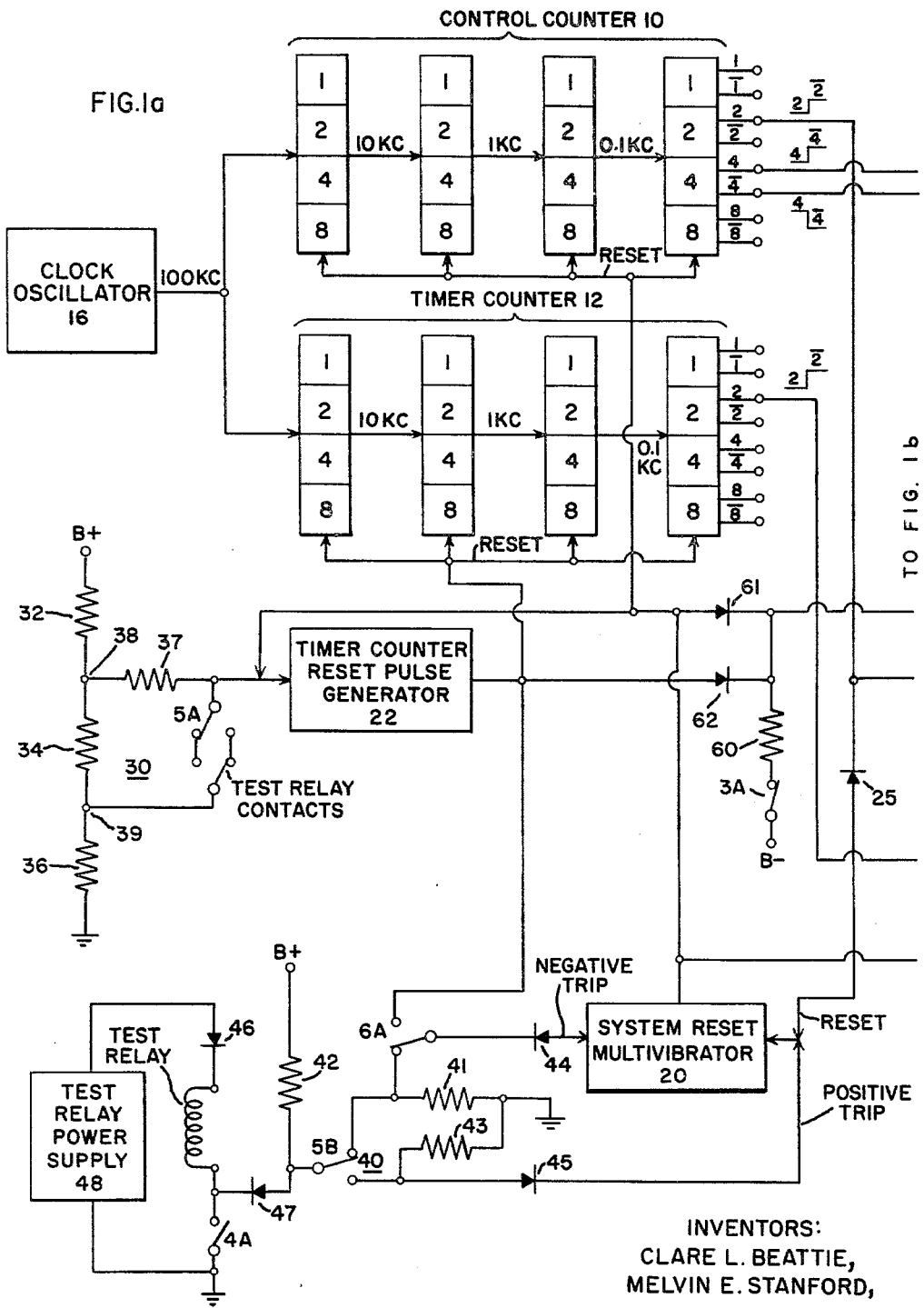

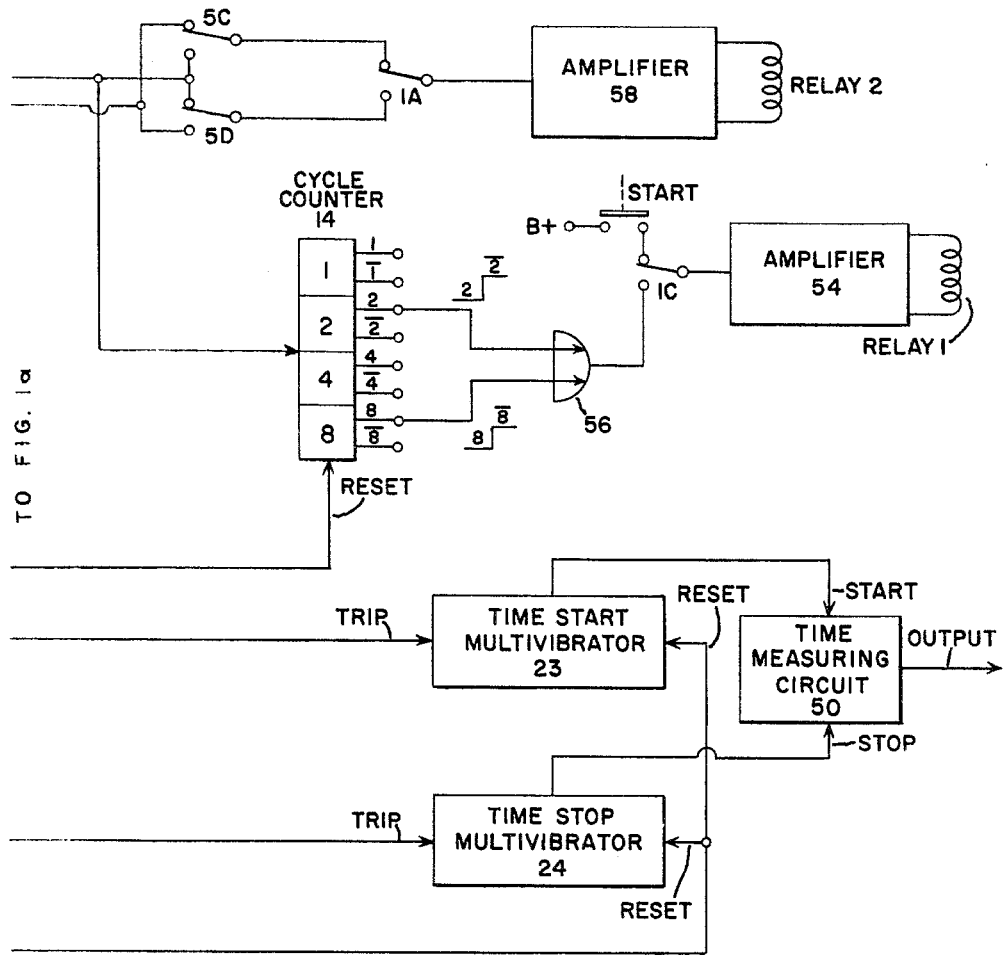
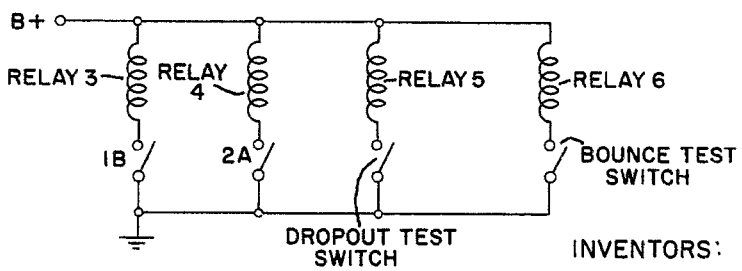

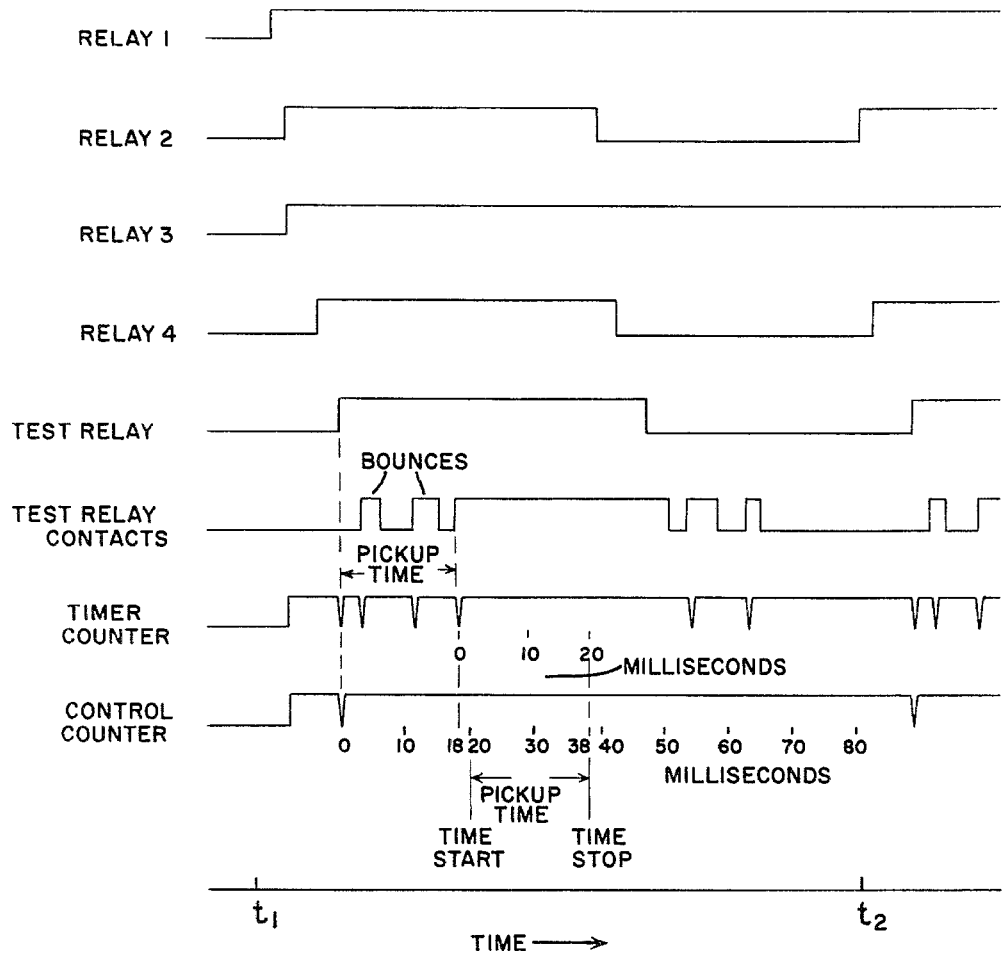

3,241,063
INTERVAL MEASURING SYSTEM USING RESETTABLE, FREE-RUNNING DIGITAL TIME MEASURING DEVICES
Clare L. Beattie, Ballston Lake, and Melvin E. Stanford, Scotia, N.Y., assignors to General Electric Company, a corporation of New York
Filed Jan. 11, 1962, Ser. No. 165,619
9 Claims. (Cl. 324—68)

The invention relates to an interval measuring system, and particularly to an interval measuring system for measuring the interval between an unstable arrival at a final condition and a stable arrival at the final condition, or for measuring the interval between a departure from an initial condition and a stable arrival at a final condition. Further, the invention relates to such interval measuring systems for use in testing the operation of electromagnetic relays.

In the art of relay testing, it may be desirable to determine several time characteristics of the relays. These are pickup time, dropout time, pickup bounce time, and dropout bounce time. This desire results from the fact that between the time a relay coil is energized or deenergized and the time the contacts finally close (or have a final minimum voltage drop thereacross) in response to such energization or deenergization, the contacts may temporarily close or engage a number of times. Such temporary closing or engaging is generally referred to as bounce. In other words, before the relay coil is energized or deenergized, the contacts are in a stable or initial condition. Upon energization or deenergization of the relay coil or winding, the contacts leave or depart from this stable or initial condition to assume or arrive at a new or final condition. However it is possible that the contacts may not assume or arrive at this new or final condition in one movement or operation, but rather may bounce a number of times. In this application, pickup time is the interval between energization of the relay coil or winding and final closing of (or final minimum voltage drop across) normally open contacts in response to such energization. Dropout time is the interval between deenergization of the coil or winding and final closing of (or final minimum voltage drop across) normally closed contacts in response to such deenergization. Pickup bounce time is the interval between the first closing, usually unstable or transient, of (or first minimum voltage drop across) normally open contacts and the final closing of (or final minimum voltage drop across) the same contacts in response to energization of the coil or winding. Dropout bounce time is the interval between the first closing, usually unstable or transient, of (or first minimum voltage drop across) normally closed contacts and the final closing of (or final minimum voltage drop across) the same contacts in response to deenergization of the coil or winding.

Therefore, an object of the invention is to provide an improved interval measuring system which can measure these four time characteristics, either for a relay or for other devices.

Interval measuring systems may require a start signal to indicate beginning of the measurement and a stop signal to indicate the end of the measurement. The start signal is relatively easy to provide, but the stop signal is not as easy to provide. Bouncing of the relay contacts may provide a number of false or temporary closings prior to the final closing of the contacts. Since it is difficult to know which closing is the last closing, it is likewise difficult to know when to provide the stop signal. Thus, it has previously been difficult, if not impossible, to measure the four time characteristics accurately.

Therefore, another object of the invention is to provide an interval measuring system which can measure time characteristics irrespective and independently of any intervening bounces or transient conditions between an initial and a final condition.

Another object of the invention is to provide an improved relay measuring system which can accurately measure pickup time, dropout time, pickup bounce time, and dropout bounce time independently of and irrespective of transient bounces during such times.

In accordance with the invention, there are provided first and second resettable measuring devices each of which is capable of providing an indication following a predetermined interval after being reset. If the invention is to be used to measure pickup or dropout bounce times, the first device is reset in response to the first unstable arrival at a final condition, this being comparable to the first closing of the contacts in response to energization or deenergization of the relay coil or winding. The second device is reset in response to each arrival at the final condition, this being comparable to each closing of the contacts. Means are coupled to the first and second devices to indicate the interval between the indication by the first device and the indication by the second device, this interval being the same as the interval between the first closing and the last closing. Since each of the devices provides an indication after a predetermined interval, this interval being sufficiently long to include all of the bouncing or temporary closings, a time or interval measurement is provided which is not affected or disturbed by temporary or transient bouncing or closing. Pickup time and dropout time are measured in a similar manner. However, means are provided to reset the first device in response to departure from the initial condition, this being comparable to energization or deenergization of the relay coil or winding. As before, the second device is reset in response to each arrival at the final condition, this being comparable to each closing of the contacts. Thus the invention measures pickup time and dropout time in an accurate manner which is not affected or disturbed by transient or temporary bouncing or closing.

The invention will be better understood from the following description given in connection with the accompanying drawing, and its scope will be pointed out in the claims. In the drawing:

FIGURES 1a and 1b show a diagram of one embodiment of an interval measuring system in accordance with the invention; and FIGURE 2 shows waveforms which illustrate one operation of the embodiment shown in FIGURES 1a and 1b.

*System description*

The embodiment shown in FIGURES 1a and 1b has been shown in two figures to prevent crowding. FIGURES 1a and 1b are to be considered as being connected together as indicated. The embodiment shown includes three counting devices or counters: a control counter 10, a timer counter 12, and a cycle counter 14. These counters 10, 12, 14 may be similar to one another, and may comprise any of the embodiments known to persons skilled in the art. In the diagram of FIGURE 1, these counters 10, 12, 14 have been assumed to consist of a number of binary decimal counting units. Each counting unit may include static devices, such as flip-flops or bistable multivibrators, there being four such devices in each counting unit of the coutners 10, 12, 14. Each counting unit counts in response to pulses applied to its input. Each of these four flip-flops indicates a binary code or condition which has a particular decimal significance. Thus, in each of the counting units, the first flip-flop has a decimal significance of one, the second flip-flop has a decimal significance of two, the third flip-flop has a decimal significance of four, and the fourth flip-flop has a decimal significance of eight. In any one of the counting units, combinations of conditions of the flip-flops may indicate any decimal number between 0 and 15, although the full range of these indications may not be needed in the invention.

The first counting units of both the control and timer counters 10, 12 are supplied with appropriate input pulses or signals from a clock oscillator 16. For illustrative purposes, it has been assumed that the required timing accuracy of the system is 0.01 millisecond. Therefore the clock oscillator 16 must produce a signal of 100 kilocycles per second. It has also been assumed that the relays under test require timing intervals in the tens of milliseconds. Therefore, the 100 kilocycles are divided by the first three counting units of the control and timer counters 10, 12 to produce a frequency of 0.1 kilocycle, this frequency having a period of 0.01 second or 10 milliseconds. Other combinations of frequencies, divisions, and timing periods may be used as will be appreciated by persons skilled in the art.

The outputs from the last counting units of the counters 10, 12, 14 are indicated by the busses having numbers indicative of their respective decimal significance. Busses designated by a plain number without a line are the presence busses which indicate the presence of the number in the flip-flops. Busses designated by a number under a line are the absence busses which indicate the absence of the number in the flip-flops. For the purposes of this description, it has been assumed that the presence bus for each flip-flop is at a relatively low or negative potential when the number is present or stored therein and is at a relatively high or positive potential when the number is absent, and that the absence bus for each flip-flop is at a relatively low or negative potential when the number is absent from the device and is at a relatively high or positive potential when the number is present or stored in the flip-flop. These are indicated by the waveforms shown adjacent the various busses which are utilized in the system.

The clock signals or pulses are applied to the inputs of the first counting units of the control and timer counters 10, 12 but not to the cycle counter 14. The last counting units of the counters 10, 12 respond and count at a ten millisecond rate. The count is indicated by the flip-flops at the presence busses and absence busses (also referred to as NOT busses). For example, if one pulse has been applied to the last counting unit of the control counter 10, the ONE bus is relatively negative and the NOT ONE bus is relatively positive; the TWO bus, the FOUR bus, and the EIGHT bus are all relatively positive and the NOT TWO bus, the NOT FOUR bus, and the NOT EIGHT bus are all relatively negative. If four pulses have been applied, the FOUR bus is relatively negative and the NOT FOUR bus is relatively positive; the ONE bus, the TWO bus, and the EIGHT bus are relatively positive, and the NOT ONE bus, the NOT TWO bus, and the NOT EIGHT bus are relatively negative. Other combinations are provided in response to the clock pulses to indicate any desired number of such applied clock pulses. The cycle counter 14 is provided with input pulses from the FOUR bus of the last counting unit of the control counter 10, one such pulse being provided each time the FOUR bus becomes relatively low indicating a count of four in the control counter 10.

The counters 10, 12, 14 may be reset by application of a suitable reset pulse as indicated. After being reset, the counters 10, 12, 14 begin counting again in response to input pulses. These reset signals are provided in several ways. A system reset multivibrator 20 provides a strong negative-going output signal in response to a negative-going trip signal at one input or in response to a positive-going trip signal at its other input. The reset multivibrator 20 may be reset so as to become responsive to appropriate input trip signals by a negative-going reset signal, supplied by the TWO bus of the control counter 10, and applied through a diode rectifier 25 to its positive-going trip signal input. The reset multivibrator 20 provides a negative-going output signal which is applied to the reset input of the control counter 10 and to the input of a timer counter reset pulse generator 22. The output of the reset multivibrator 20 is also applied to the reset inputs of time start and time stop multivibrators 23, 24. The output of the pulse generator 22 is a negative-going signal which is applied to the reset input of the timer counter 12. The pulse generator 22 provides a strong negative-going signal in response to a negative-going signal from the system reset multivibrator 20 or from the test relay contacts as will be explained.

The pulse generator 22 is supplied with signals from the system reset multivibrator 20 and also with signals from a voltage dividing network 30. This network 30 includes a series of resistors 32, 34, 36 coupled between a source of positive direct current potential B+ and a point of reference potential or ground. A resistor 37 is coupled to the junction 38 of the two upper resistors 32, 34. With the contacts 5A and the test relay contacts in the position shown, the relatively positive voltage at the junction 38 is applied to the input of the pulse generator 22. With the contacts 5A in the position shown, and with the test relay contacts operated, the input of the pulse generator 22 is connected to the junction 39 of the two lower resistors 34, 36, this junction 39 having a relatively negative voltage. The pulse generator 22 produces a negative-going reset signal at its output in response to this relatively negative voltage. The reset multivibrator 20 is provided with negative-going trip signals through a diode rectified 44, and with positive-going trip signals through a diode rectifier 45. The rectifier 44 may either be connected to the pulse generator 22 or to a network 40 depending on the position of relay contacts 6A. The rectifier 45 is connected to the network 40. This network 40 includes: a resistor 42 coupled between the source B+ and relay contacts 5B; and two resistors 41, 43 coupled between ground and the contacts 5B. These two resistors 41, 43, along with the resistor 42, form a voltage divider which places relay contacts 5B at a relatively positive voltage as long as relay contacts 4A are open. The network 40 also includes diode rectifiers 46, 47, the winding of the test relay, and a test relay power supply 48 for energizing the winding of the test relay. The relay contacts 5B are coupled to the junction of the diode rectifier 47 and the resistor 42. With relay contacts 4A in their normally open position as shown, relay contacts 5B are at a relatively positive potential. However, when relay contacts 4A are closed, relay contacts 5B in either position are lowered in potential because the diode rectifier 47 connects these contacts 5B to ground. A time measuring circuit 50 is provided, this circuit being provided with a start signal from the output of the time start multivibrator 23 and with a stop signal from the output of the time stop multivibrator 24. The time measuring circuit 50 may take a number of known forms such as a digital output device which provides a digital indication of the interval between the start signal and the stop signal, or such as an analog output device (such as an operational amplifier with capacitive feedback) which provides an analog indication (i.e., linear voltage change relative to time) of the interval between the start signal and the stop signal.

The system includes six relays in addition to the relay to be tested by the system. In FIGURES 1a and 1b, and in the following description, the relay windings are indicated by the word "relay" followed by a number, and the associated contacts are indicated or described by the relay number followed by a letter. Thus "relay 1" indicates the winding of relay 1, and contacts "1A" indicate the A contacts or A set of contacts associated with relay 1. Relay 1 is supplied with suitable energization by an amplifier 54 which may be turned on or off as will be explained. Relay 1 has contacts 1A, 1B, and 1C. Contacts 1C couple the amplifier 54 to a start button or to a logic AND gate 56. The start button is connected to the source B+, and is arranged so that its contacts remain engaged only as long as the button is held operated. As known in the art, an AND gate requires the presence of all of a number of input conditions to produce an output. Two inputs are supplied to the AND gate 56 from the TWO bus and the EIGHT bus of the cycle counter 14. Relay 2 is provided with suitable energization by an amplifier 58 which may be turned on or off as will be explained. Contacts 1A couple the amplifier 58 to contacts 5C or contacts 5D which are coupled in reversing fashion to the FOUR and NOT FOUR busses of the control counter 10. Contacts 1B couple relay 3 between the source B+ and ground when closed.

Relay 2 has normally open contacts 2A. These contacts 2A connect relay 4 between the source B+ and ground when closed.

Relay 3 has normally closed contacts 3A which connect a source of negative or reset direct current potential B— through a suitable resistor 60 and diode rectifiers 61, 62 to the reset inputs of the counters 10, 12, 14 and the time start and time stop multivibrators 23, 24 for the purpose of holding the system in the reset condition.

Relay 4 has normally open contacts 4A. These contacts 4A connect the test relay in series with the test relay power supply 48 and the diode rectifier 46.

Relay 5 is coupled between the source B+ and ground through a dropout test switch which is closed when dropout time or dropout bounce time is to be measured. Relay 5 has contacts 5A, 5B, 5C, and 5D. Contacts 5A provide reversing connections for the test relay contacts, contacts 5B provide reversing connections between the test relay winding and the reset multivibrator 20, and contacts 5C and 5D provide reversing connections between the FOUR bus and NOT FOUR bus of the last counting unit of the control counter 10 and the contacts 1A.

Relay 6 is coupled between the source B+ and ground through a bounce test switch. This bounce test switch is closed whenever pickup bounce time or dropout bounce time is to be measured. Relay 6 has contacts 6A which connect the reset multivibrator 20 either to the test relay for a pickup time test or to the reset pulse generator 22 for a pickup bounce time or a dropout bounce time test.

*System operation—pickup time*

The operation of the interval measuring system will now be described and explained. First, this operation will be explained in connection with the system as used to measure the pickup time of a relay. As will be recalled, the pickup time is that interval between the time when the relay coil is energized and the time when the contacts are finally closed (or have a final predetermined or prescribed minimum voltage drop thereacross). In this description, it has been assumed that the test relay has been inserted or placed in a suitable socket or receptacle so that its winding and its contacts are appropriately connected into the system as shown. The system shown in FIGURE 1 is in its deenergized condition. All counters 10, 12, 14 are held reset by the negative source of potential B— which is applied to the reset inputs of the counters 10, 12, 14 through contacts 3A, the resistor 60, and the diode rectifiers 61, 62. The time start and stop multivibrators 23, 24 are also held reset in the same way. Since the measurement being described is a pickup time measurement, the dropout test switch is open and the bounce test switch is open. Therefore relays 5 and 6 will not be energized or used during this operation. Operation is initiated by closing the start switch which momentarily connects the source B+ to the amplifier 54 which energizes relay 1. Contacts 1A, 1B, and 1C move to their operated condition. Contacts 1C connect the input of the amplifier 54 to the output of AND gate 56 which supplies a positive potential to the amplifier 54 as a result of the relatively positive potential on both the TWO and EIGHT busses of the cycle counter 14. This positive potential causes the amplifier 54 to keep relay 1 energized. Thus, relay 1 is operated or locked in through its contacts 1C. Contacts 1A remove the input of the amplifier 58 from contacts 5C and connect the input of the amplifier 58 to contacts 5D. Contacts 5D provide a relatively positive potential from the FOUR bus of the control counter 10 since at this time the control counter 10 is in the reset condition and has a zero count in it. This relatively positive potential causes the amplifier 58 to energize relay 2. Relay 2 has only one set of contacts 2A which, when closed, energize relay 4. Contacts 1B energize relay 3 which has only one set of contacts 3A associated with it. Contacts 3A open and remove the negative source B— from the system including the three counters 10, 12, 14. The control counter 10 and the timer counter 12 begin counting in response to signals from the clock oscillator 16. When relay 4 is energized in response to closure of contacts 2A, contacts 4A close to energize the test relay by the test relay power supply 48 which is connected through the diode 46 and the test relay to ground. As soon as this occurs, a negative-going signal is produced and passes through contacts 5B and 6A and the diode 44 to trip the reset multivibrator 20. (This reset multivibrator 20 had been previously reset by a negative-going signal at its positive trip input in a manner to be described.) The reset multivibrator 20 produces a negative-going signal at its output which resets the control counter 10 and permits it to start counting at a time indicative of and in response to energization of the test relay. This same output is also applied to the reset pulse generator 22 which produces a negative-going output which resets the timer counter 12. After some length of time determined by the test relay characteristics, the test relay contacts leave their initial condition or state and move to the other or new condition or state. As soon as they make their first contact or closing in this other or new condition or state, contacts 5A receive a negative-going signal which is applied to the input of the reset pulse generator 22. The generator 22 produces a negative-going reset signal at its output and this resets the timer counter 12.

Thus each time that the test relay contacts close in their new state in response to energization of the test relay, the timer counter 12 is reset. However, it is to be noted and remembered that the control counter 10 is counting continuously, since it was last reset when the test relay was energized. After some further length of time in which the test relay contacts may temporarily close several times, the contacts finally close in their new state and remain so closed. Thus, the timer counter 12 receives its last reset and begins counting in response to the clock signals. Some time after the last reset of the timer counter 12, the control counter 10 reaches a count of two in its last counting unit, this count it will be recalled representing 20 milliseconds. When this count of two is reached, the TWO bus of the last counting unit of the control counter 10 goes relatively negative, and this negative signal is applied to the trip input of the time start multivibrator 23. The time start multivibrator 23 is tripped and provides a start signal to the time measuring circuit 50. Also when the last counting unit of the control counter 10 reaches a count of two, the negative-going signal of its TWO bus is also coupled through the diode 25 to reset the system reset multivibrator 20 so that it will respond and become tripped in response to a new trip signal. Then, 20 milliseconds after last being reset, the timer counter 12 reaches a count of two in the last counting unit so that its TWO bus goes relatively negative. This produces a negative-going signal which is applied to the trip input of the time stop multivibrator 24. The time stop multivibrator 24 produces an output signal which stops the time measuring circuit 50 and thus enables a time output to be derived. It will thus be seen that the time start multivibrator 23 produces a time start signal 20 milliseconds after the test relay is energized and that the time stop multivibrator 24 produces a time stop signal 20 milliseconds after the last or final closing of the test relay contacts. Thus an accurate indication of the pickup time is provided 20 milliseconds later to include the last or final closing of the test relay contacts. Subsequently, the last counting unit of the control counter 10 reaches a count of four, this occurring at 40 milliseconds after the control counter 10 was last reset. When the control counter 10 reaches a count of four, its FOUR bus becomes relatively negative to produce a negative-going signal which is applied to the amplifier 58 through contacts 5D and operated contacts 1A. This causes the amplifier 58 to deenergize relay 2. Contacts 2A are then opened to deenergize relay 4. Contacts 4A are then opened to deenergize the test relay and permit the test relay contacts to return to their initial or deenergized position. Also when the last counting unit of the control counter 10 reaches a count of four, its FOUR bus provides a negative-going input signal for the cycle counter 14 which then records or registers a count of one. Relay 1 stays operated or energized. This count of one represents one cycle of operation of the test relay.

The control counter 10 continues to count as does the timer counter 12. However, the timer counter 12 does not produce any further significant action at this time. When the last counting unit of the control counter 10 reaches a count of eight, the FOUR bus becomes relatively positive again and the NOT FOUR bus becomes relatively negative again. The now relatively positive FOUR bus provides a new positive-going signal to the amplifier 58 which energizes relay 2 again. Contacts 2A energize relay 4, and contacts 4A again energize the test relay to renew or begin the cycle again. The cycles of energizing the test relay and measuring the time interval between this energization and the final closing of the test relay contacts are repeated ten times. Each completion of such a cycle is counted by the cycle counter 14. When ten such cycles have occurred, a count of ten is present in the cycle counter 14 so that the TWO bus and the EIGHT bus are both relatively negative. As long as both a two and an eight are not present in the cycle counter 14, a positive signal is presented at the output of AND gate 56 to hold relay 1 energized. However, as soon as both a two and an eight are present in the cycle counter 14 (this representing ten cycles), the TWO bus and the EIGHT bus both become relatively negative which produces a relatively negative signal at the input of the amplifier 54 so as to deenergize relay 1. When relay 1 becomes deenergized, relay 2 becomes deenergized because contacts 1A connect the input of the amplifier 58 through contacts 5C to a now relatively negative signal on the NOT FOUR bus of the control counter 10. Contacts 1B deenergize relay 3, and contacts 2A deenergize relay 4 so that all relays, including the test relay, are restored to normal. Contacts 3A close to reset or to keep reset the counters 10, 12, 14, and the time start and stop multivibrators 23, 24. The time start multivibrator 23 and the reset multivibrator 20 were reset when the last counting unit of the control counter 10 reached a count of two, this count of two providing a negative-going reset signal.

The operation described above for the pickup time may be better understood by reference to the waveforms plotted as a function of time as shown in FIGURE 2. In FIGURE 2, waveforms representing the operation of relay 1, relay 2, relay 3, relay 4, the test relay, the test relay contacts, the timer counter, and the control counter are shown. The upper level of each waveform represents relay operation, contact closing, or counting as the case may be, and the lower level of each waveform represents normal or unoperated conditions.

At time $t_1$, the start switch is closed to operate relay 1. The operation of relay 1 causes operation of relay 2 and relay 3. (The operation of relay 3 removes the reset signal and both counters begin to count.) The operation of relay 2 causes operation of relay 4, and the operation of relay 4 causes operation of the test relay. When the test relay is operated, the control counter is reset to start a new count, this being at the time indicated as zero milliseconds on the individual time axis for the control counter. The test relay contacts close or bounce in the manner indicated by the test relay contacts waveform, it having been assumed that after operation of the test relay there are two intermediate closings or bounces before final position or closing of the contacts is attained. At the time the test relay is operated, and each time that the test relay contacts close, the timer counter is reset, each reset being indicated by the short duration negative-going spike. After the last reset of the timer counter (at the time indicated as zero milliseconds on the individual time axis for the timer counter, and as 18 milliseconds on the control counter time axis), the timer counter is permitted to count. After 20 milliseconds of count by the control counter some time later, a time start signal is provided by the time start multivibrator. After 20 milliseconds of count by the timer counter following its last reset, a time stop signal is provided by the time stop multivibrator. On the control counter time axis, this occurs at 38 milliseconds. The interval between the time start and the time stop signals is the same as the interval between the time when the test relay was operated and the last closing of the test relay contacts. These are indicated as the pickup times in the test relay contacts waveform and in the control counter waveform. It will be seen that the pickup time, as measured on the time scale of the control counter, is between zero and 18 milliseconds, a total pickup time therefore of 18 milliseconds. This same pickup time is provided by the time start and time stop signals between 20 milliseconds and 38 milliseconds shown on the control counter time scale. While this time indication is precisely or substantially precisely the same as the true pickup time, it is displaced or measured at a time following the last contact closing so that no erroneous or misinterpreted reading or indication is provided. After the control counter reaches a count of 40 milliseconds, relay 2 is deenergized and the circuit is restored to normal. Then, after the control counter reaches a count of 80 milliseconds, relay 2 is again operated, at some time approximately $t_2$, to start the cycle again. After ten such cycles, all relays are deenergized and all elements are reset to await a new cycle of operation.

Although ten cycles of operation have been selected and shown, any number of such cycles can be used. However, it has been found that ten cycles represent a number of operations over which a good average of the pickup time, or any such measurement, may be measured.

System operation—dropout time

In order that dropout time may be measured, the system first causes the test relay to be energized and then deenergizes the winding of the test relay and measures the time between deenergization of this winding and the final closing of the contacts. This is measured in substantially the same way except that the dropout test switch is first closed to energize relay 5. Contacts 5A connect the reset pulse generator 22 to the test relay contacts which are closed when the test relay is deenergized. Contacts 5B connect the test relay to the reset multivibrator 20 trip input which is responsive to positive-going signals. And contacts 5C and 5D reverse the polarities applied to the amplifier 58 through contacts 1A. Thus, relay 2 is immediately energized on closing of the dropout test switch and even before beginning the pushing of the start button. This results from the fact that contacts 1A now are connected to the FOUR bus which is now relatively positive. Contacts 2A energize relay 4. Contacts 4A energize the test relay. Now, contacts 5B connect the relatively negative signal provided by the test relay to the positive trip input of the reset multivibrator 20. With the test relay operated or energized, the test relay contacts are in their operated position. At this point contacts 5A and the test relay contacts are in opposite positions relative to the positions shown in FIGURE 1. When the start button is depressed, relay 1 is energized. Contacts 1A now swing to the negative side to deenergize relay 2. Contacts 2A deenergize relay 4. Contacts 4A deenergize the test relay. Contacts 1C hold relay 1 energized and contacts 1B energize relay 3. Contacts 3A open to remove the reset voltage B—. When the test relay is deenergized, it will be seen that a positive-going signal is supplied through operated contacts 5B and the diode 45 to trip the reset multivibrator 20. This resets the control counter 10 in response to deenergization of the test relay. This also resets the time start and the time stop multivibrators 23, 24. Each time the test relay contacts close, a reset signal is provided by the reset pulse generator 22. Thus, the system goes through the same operation as described in connection with the pickup time. However, the system is arranged to count or indicate the dropout time as opposed to the pickup time. After ten such cycles, the system is restored to normal to await a new series of tests or a new relay.

*System operation—pickup bounce time and dropout bounce time*

If bounce time, either pickup or dropout, is to be measured, the bounce test switch is first closed to energize relay 6. Contacts 6A of this relay then connect the reset multivibrator 20 trip input to the output of the reset pulse generator 22. If pickup bounce time is to be measured, the dropout test switch is left open. However, if dropout bounce time is to be measured, the dropout test switch is closed. The pickup and dropout bounce times differ from the pickup time and dropout time in that the reset multivibrator 20 is reset in response to the first closing of the test relay contacts rather than in response to energization or deenergization of the test relay. This is because contacts 6A connect the negative trip input of the reset multivibrator 20 to the reset pulse generator 22 rather than to the test relay. Thus, upon the first test relay contact closing, either in pickup or dropout, a negative-going signal is provided by the reset pulse generator 22 to provide a negative-going output signal from the reset multivibrator 20. Thus, the control counter 10 begins its count upon first closing of the test relay contacts rather than upon energization or deenergization of the test relay. The system reset multivibrator 20 is not responsive to further negative-going signals from the reset pulse generator 22 because it is already tripped. However, the timer counter 12 is receptive to such signals and is reset in response to each closure of the test relay contacts. After the final closure of the test relay contacts, the control counter 10 and the timer counter 12 provide their respective signals which indicate the pickup bounce time or the dropout bounce time. After ten such indications, the cycle counter 14 deenergizes relay 1 to restore the circuit to normal.

Although most of the circuits shown in FIGURE 1 have been functionally indicated as a block diagram, persons skilled in the art will appreciate that a number of embodiments may be used in such circuits. For example, an operational amplifier with capacity feedback may be utilized for the time measuring circuit 50, such an amplifier being known to persons skilled in the art. However, the time measuring circuit 50 may be other devices such as a digital counter which visually indicates time measured. Persons skilled in the art will appreciate that other changes or variations may be made in the system described. The counters 10, 12, 14 may take a number of forms. Further, the system may be modified so that it measures any one of the four conditions indicated rather than all four. Also, various static devices may be used in place of the relays and other mechanical devices at appropriate places. In any event, it is to be understood that modifications may be made by persons skilled in the art without departing from the spirit of the invention or from the scope of the claims.

What we claim as new and desire to secure by Letters Patent of the United States is:

1. A time interval measuring apparatus for indicating the time interval between unstable arrival at a final condition of a device to be tested and stable arrival at the final condition of the device to be tested wherein the device to be tested has an initial stable condition and is operated during the testing thereof to a final stable condition wherein one or more unstable final conditions may occur before the final stable condition is reached comprising:

(a) a first resettable measuring device, said first resettable measuring device producing a signal indicating when a predetermined time interval has passed after reset of said first resettable measuring device, (b) a second resettable measuring device, said second resettable measuring device producing a signal indicating when a predetermined time interval has passed after reset of said second resettable measuring device, (c) means connected to said first resettable measuring device responsive to the first unstable arrival at the final condition of the device being tested for resetting said first resettable measuring device, (d) means connected to said second resettable measuring device responsive to the stable arrival at the final condition of the device being tested for resetting said second resettable measuring device, and (e) means coupled to said first and said second resettable measuring devices for producing a signal indicating the time interval between the signal by said first resettable measuring device indicating when the predetermined time interval measured by said first resettable measuring device has passed and the signal by said second resettable measuring device indicating when the predetermined time interval measured by said second resettable measuring device has passed.

2. A time interval measuring apparatus as described in claim 1 wherein said first and said second resettable measuring devices comprise resettable counting devices.

3. A time interval measuring apparatus for indicating a time interval between unstable arrival at a final condition of a device to be tested and stable arrival at the final condition of the device to be tested wherein the device to be tested has an initial stable condition and is operated during the testing thereof to a final stable condition wherein one or more unstable final conditions may occur before the final stable condition is reached comprising:

(a) a first resettable time measuring device, (b) a second resettable time measuring device, (c) means connected to said first resettable time measuring device and responsive to the first unstable arrival at the final condition oft he device being tested for resetting said first resettable time measuring device, (d) means connected to said second resettable time measuring device and responsive to the stable arrival at the final condition of the device being tested for resetting said second resettable time measuring device, (e) first means conected to said first resettable time measuring device producing a signal indicating when a predetermined time interval after reset of said first resettable time measuring device has occurred, (f) second means connected to said second resettable time measuring device producing a signal indicating when a predetermined time interval after reset of said second resettable time measuring device has occurred, and (g) means coupled to said first and said second means for producing a signal indicating the time interval between the signal by said first means indicating when the predetermined time interval measured by said first means has passed and the signal by said second means indicating when the predetermined time interval measured by said second means has passed.

4. A time interval measuring apparatus as described in claim 3 wherein said resettable time measuring devices comprise resettable counting devices.

5. A time interval measuring apparatus as described in claim 3 further including means coupled to said first means for repeating the time interval measurement procedure in response to the passage of a second predetermined time interval after reset of said first resettable time measuring device.

6. A time interval measuring apparatus for indicating a time interval between departure from an initial stable condition of a device to be tested and the stable arrival at a final condition of a device wherein the device to be tested has an initial stable condition and is operated during the testing thereof to a final stable condition wherein one or more unstable final conditions may occur before the final stable condition is reached comprising:

(a) a first resettable measuring device, said first resettable measuring device producing a signal indicating when a predetermined time interval has passed after reset of said first resettable measuring device, (b) a second resettable measuring device, said second resettable measuring device producing a signal indicating when a predetermined time interval has passed after reset of said second resettable measuring device, (c) means connected to said first resettable measuring device responsive to the departure from its initial stable condition of the device being tested for resetting said first resettable measuring device, (d) means connected to said second resettable measuring device responsive to the stable arrival at the final condition of the device being tested for resetting said second resettable measuring device, and (e) means coupled to said first and said second resettable measuring devices for producing a signal indicating the time interval between the signal by said first resettable measuring device indicating when the predetermined time interval measured by said first resettable measuring device has passed and the signal by said second resettable measuring device indicating when the predetermined time interval measured by said second resettable measuring device has passed.

7. A time interval measuring apparatus for indicating a time interval between departure from an initial stable condition of a device to be tested and the stable arrival at the final condition of the device to be tested wherein the device to be tested has an initial stable condition and is operated during the testing thereof to a final stable condition wherein one or more unstable final conditions may occur before the final stable condition is reached comprising:

(a) a first resettable time measuring device, (b) a second resettable time measuring device, (c) means connected to said first resettable measuring device responsive to the departure from the initial stable condition of the device to be tested for resetting said first resettable measuring device, (d) means connected to said second resettable measuring device responsive to the stable arrival at the final condition of the device to be tested for resetting said second resettable measuring device, (e) first means connected to said first resettable measuring device producing a signal indicating when a predetermined time interval has passed after reset of said first resettable measuring device, (f) means connected to said second resettable measuring device producing a signal indicating when a predetermined time interval has passed after reset of said second resettable measuring device, and (g) means coupled to said first and said second resettable measuring devices producing a signal indicating the time interval between the signal by said first resettable measuring device indicating when the predetermined time interval measured by said resettable measuring device has passed and the signal by said second resettable measuring device indicating when the predetermined time interval measured by said second resettable measuring device has passed.

8. A time interval measuring apparatus as described in claim 7 wherein said resettable time measuring devices comprise resettable counting devices.

9. A time interval measuring apparatus as described in claim 7 further including means coupled to said first means for repeating the time interval measuring procedure in response to the passage of a second predetermined time interval after the reset of said first resettable time measuring device.

References Cited by the Examiner

UNITED STATES PATENTS

| 2,432,092 | 12/1947 | Ferrell | 324—28 |
| 2,494,352 | 1/1950 | Moyer et al. | 324—68 |
| 2,828,465 | 3/1958 | Morton | 324—28 |
| 2,844,668 | 7/1958 | West | 324—68 |
| 2,877,405 | 3/1959 | Morton | 324—28 |

OTHER REFERENCES

"Time Measurement of Sequential Contacts" (K. L. Morton), Tele-Tech and Electronic Industries, dated October 1955.

FREDERICK M. STRADER, *Primary Examiner.*

WALTER L. CARLSON, *Examiner.*